(«12») United States Patent
Chua et al.

(10) Patent No.: US 10,255,905 B2
(45) Date of Patent: Apr. 9, 2019

(54) PREDICTING PRONUNCIATIONS WITH WORD STRESS

(71) Applicant: Google LLC, Mountain View, CA (US)

(72) Inventors: Mason Vijay Chua, Mountain View, CA (US); Kanury Kanishka Rao, Sunnyvale, CA (US); Daniel Jacobus Josef van Esch, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 24 days.

(21) Appl. No.: 15/178,719

(22) Filed: Jun. 10, 2016

(65) Prior Publication Data

US 2017/0358293 A1    Dec. 14, 2017

(51) Int. Cl.
*G10L 13/08* (2013.01)
*G10L 13/10* (2013.01)
(Continued)

(52) U.S. Cl.
CPC .......... *G10L 13/10* (2013.01); *G10L 13/0335* (2013.01); *G10L 13/047* (2013.01);
(Continued)

(58) Field of Classification Search
CPC ..... G10L 13/08; G10L 13/0335; G10L 13/04; G10L 13/047; G10L 13/10; G10L 15/16; G10L 17/18; G10L 25/30
See application file for complete search history.

(56) References Cited

U.S. PATENT DOCUMENTS 4,695,962 A * 9/1987 Goudie ................... G10L 13/07
704/260
5,758,022 A * 5/1998 Trompf .................. G10L 15/16
704/232
(Continued)

FOREIGN PATENT DOCUMENTS

JP    2001-075585    3/2001
WO    2004/104988    12/2004
WO    2015/191968    12/2015

OTHER PUBLICATIONS

Bates and Ostendorf, "Modeling Pronunciation Variation in Conversational Speech Using Prosody," ISCA Tutorial and Research Workshop (ITRW) on Pronunciation Modeling and Lexicon Adaptation for Spoken Language Technology, 2002, 6 pages.
(Continued)

*Primary Examiner* — Eric Yen
(74) *Attorney, Agent, or Firm* — Fish & Richardson P.C.

(57) ABSTRACT

Methods, systems, and apparatus, including computer programs encoded on computer storage media, for generating word pronunciations. One of the methods includes determining, by one or more computers, spelling data that indicates the spelling of a word, providing the spelling data as input to a trained recurrent neural network, the trained recurrent neural network being trained to indicate characteristics of word pronunciations based at least on data indicating the spelling of words, receiving output indicating a stress pattern for pronunciation of the word generated by
(Continued)

the trained recurrent neural network in response to providing the spelling data as input, using the output of the trained recurrent neural network to generate pronunciation data indicating the stress pattern for a pronunciation of the word, and providing, by the one or more computers, the pronunciation data to a text-to-speech system or an automatic speech recognition system.

19 Claims, 6 Drawing Sheets

(51) Int. Cl.
| | | |
|---|---|---|
| G10L 15/02 | (2006.01) | |
| G10L 15/06 | (2013.01) | |
| G10L 15/16 | (2006.01) | |
| G10L 15/18 | (2013.01) | |
| G10L 17/18 | (2013.01) | |
| G10L 25/30 | (2013.01) | |
| G10L 13/033 | (2013.01) | |
| G10L 13/047 | (2013.01) | |
| G10L 15/187 | (2013.01) | |

(52) U.S. Cl.
CPC .............. *G10L 13/08* (2013.01); *G10L 15/02* (2013.01); *G10L 15/063* (2013.01); *G10L 15/16* (2013.01); *G10L 15/1815* (2013.01); *G10L 17/18* (2013.01); *G10L 25/30* (2013.01); *G10L 15/187* (2013.01); *G10L 2015/027* (2013.01)

(56) References Cited

U.S. PATENT DOCUMENTS

| | | | | | |
|---|---|---|---|---|---|
| 5,913,194 | A * | 6/1999 | Karaali | ............... | G10L 13/02 704/259 |
| 5,930,754 | A * | 7/1999 | Karaali | ............... | G10L 13/08 704/232 |
| 6,029,132 | A * | 2/2000 | Kuhn | ............... | G10L 13/08 704/258 |
| 6,411,932 | B1 * | 6/2002 | Molnar | ............... | G09B 19/04 704/254 |
| 6,574,597 | B1 * | 6/2003 | Mohri | ............... | G10L 15/183 704/251 |
| 8,060,565 | B1 * | 11/2011 | Swartz | ............... | G10L 13/00 704/4 |
| 9,697,835 | B1 * | 7/2017 | Kuo | ............... | G10L 15/26 |
| 2001/0041978 | A1 * | 11/2001 | Crespo | ............... | G10L 15/1815 704/257 |
| 2002/0091512 | A1 * | 7/2002 | Karttunen | ............... | G10L 15/193 704/202 |
| 2004/0059568 | A1 * | 3/2004 | Talkin | ............... | G10L 13/07 704/205 |
| 2004/0204939 | A1 * | 10/2004 | Liu | ............... | G10L 15/28 704/239 |
| 2006/0074674 | A1 * | 4/2006 | Zhang | ............... | G10L 13/04 704/260 |
| 2010/0153115 | A1 * | 6/2010 | Klee | ............... | G10L 13/08 704/260 |
| 2011/0066578 | A1 * | 3/2011 | Chong | ............... | G06N 99/005 706/12 |
| 2012/0035917 | A1 * | 2/2012 | Kim | ............... | G10L 13/10 704/200.1 |
| 2012/0143611 | A1 * | 6/2012 | Qian | ............... | G10L 13/07 704/260 |
| 2013/0231917 | A1 * | 9/2013 | Naik | ............... | G10L 13/086 704/9 |
| 2015/0127327 | A1 * | 5/2015 | Bacchiani | ............... | G10L 25/30 704/202 |
| 2015/0364128 | A1 * | 12/2015 | Zhao | ............... | G06N 3/0445 704/259 |
| 2016/0049144 | A1 * | 2/2016 | Conkie | ............... | G10L 15/063 704/234 |
| 2016/0086600 | A1 * | 3/2016 | Bauer | ............... | G10L 15/16 704/202 |
| 2016/0111108 | A1 * | 4/2016 | Erdogan | ............... | G10L 21/0216 704/202 |
| 2017/0323636 | A1 * | 11/2017 | Xiao | ............... | G10L 15/16 |

OTHER PUBLICATIONS

Bilcu, "Text-To-Phoneme Mapping Using Neural Networks," Tampere University of Technology, Oct. 2008, 150 pages.

Bisani and Ney, "Joint-Sequence Models for Grapheme-to-Phoneme Conversion," Speech Communication, Elsevier, 2008, 50(5), 43 pages.

Coleman, "Improved prediction of stress in out-of-vocabulary words," State of the Art in Speech Synthesis (Ref. No. 2000/058), IEE Seminar on, 2000, 6 pages.

Dean et al., "Large Scale Distributed Deep Networks," Large Scale Distributed Deep Networks, 2012, pp. 1223-1231.

Dou et al., "A Ranking Approach to Stress Prediction for Letter-to-Phoneme Conversion," Proceedings of the 47th Annual Meeting of the ACL and the 4th IJCNLP of the AFNLP, Aug. 2009, pp. 118-126.

Galescu and Allen, "Pronunciation of Proper Names with a Joint N-Gram Model for Bi-Directional Grapheme-to-Phoneme Conversion," 7$^{th}$ International Conference on Spoken Language Processing (ICSLP2002), Sep. 2002.

Graves et al., "Connectionist Temporal Classification: Labelling Unsegmented Sequence Data with Recurrent Neural Networks," Proceedings of the 23$^{rd}$ International Conference on Machine Learning, Jun. 2006, pp. 369-376.

Hahn et al., "Comparison of Grapheme-to-Phoneme Methods on Large Pronunciation Dictionaries and LVCSR Tasks," INTERSPEECH, Sep. 2012, pp. 2538-2541.

Hochreiter and Schmidhuber, "Long Short-Term Memory," Neural Computation 9(8):1735-1780, 1997.

Kou et al., "Fix it where it fails: Pronunciation learning by mining error corrections from speech logs," Acoustics, Speech and Signal Processing (ICASSP), 2015 IEEE International Conference on, Apr. 2015, pp. 4619-4623.

Lehnen et al., "Structure Learning in Hidden Conditional Random Fields for Grapheme-to-Phoneme Conversion," INTERSPEECH, Aug. 2013, pp. 2326-2330.

Liberman and Church, "Text Analysis and Word Pronunciation in Text-to-speech Synthesis," In Advances in Speech Signal Processing, 1992, pp. 791-831.

Novak et al., "Failure transitions for Joint n-gram Models and G2P Conversion," INTERSPEECH, Aug. 2013, pp. 1821-1825.

Novak et al., "Improving WFST-based G2P Conversion with Alignment Constraints and RNNLM N-best Rescoring," INTERSPEECH, Sep. 2012, pp. 2526-2529.

Rao et al., "Grapheme-to-phoneme conversion using long short-term memory recurrent neural networks," Acoustics, Speech and Signal Processing (ICASSP), 2015 IEEE International Conference on, Apr. 2015, pp. 4225-4229.

Rutherford et al., "Pronunciation Learning for Named-Entities through Crowd-Sourcing," INTERSPEECH, 2014, pp. 1448-1452.

Sazhok and Robeiko, "Bidirectional Text-To-Pronunciation Conversion with Word Stress Prediction for Ukrainian," Proc. All-Ukrainian Int. Conference on Signal/Image Processing and Pattern Recognition, 2012, pp. 43-46.

Sproat and Hall, "Applications of Maximum Entropy Rankers to Problems in Spoken Language Processing," INTERSPEECH, Sep. 2014, pp. 761-764.

Taylor, "Text-to-Speech Synthesis," Cambridge University Press, 2009, 627 pages.

Urbancyzk and Eady, "Assignment of syllable stress in a demisyllable-based text-to-speech synthesis system," Communications, Computers and Signal Processing, 1989. Conference Proceeding., IEEE Pacific Rim Conference on, Jun. 1989, pp. 467-470.

(56) References Cited

OTHER PUBLICATIONS

Wang and King, "Letter-to-Sound Pronunciation Prediction Using Conditional Random Fields," IEEE Signal Processing Letters, 18(2):122-125, Feb. 2011.
Webster, "Improving Letter-to-Pronunciation Accuracy with Automatic Morphologically-Based Stress Prediction," INTERSPEECH, 2004, 4 pages.
Wu et al., "Encoding linear models as weighted finite-state transducers," INTERSPEECH, 2014, pp. 1258-1262.
International Search Report and Written Opinion in International Application No. PCT/US2016/065759, dated Apr. 24, 2017, 20 pages.
Hain. "Automation of the Training Procedures for Neural Networks Performing Multi-Lingual Grapheme to Phoneme Conversion," $6^{th}$ European Conference on Speech Communication and Technology. Budapest, Hungary, Sep. 5-9, 1999, 4 pages.
Invitation to Pay Additional Fees and Partial Search Report in International Application No. PCT/US2016/065759, dated Mar. 2, 2017, 9 pages.
Rocotti et al. "Learning of word stress in a sub-optimal second order back-propagation neural network," Proceedings of the International Conference on Neural Networks. San Diego, CA, Jul. 24-27, 1988, 7 pages.
Van Esch et al. "Predicting Pronunciations with Syllabification and Stress with Recurrent Neural Networks," Interspeech 2016, vol. 2016, Sep. 8, 2016, 5 pages.

\* cited by examiner

PREDICTING PRONUNCIATIONS WITH WORD STRESS

BACKGROUND

Automatic speech recognition (ASR) systems, text-to-speech (TTS) systems, or both, may use word pronunciation data to determine an utterance of a word encoded in an audio signal or to generate an audio signal encoding a synthesized utterance of the word, respectively. Some ASR and TTS systems may use a manually curated pronunciation dictionary. The entries in the dictionary may include phoneme sequences, e.g. "foo"→/f u/(in X-SAMPA notation).

SUMMARY

A pronunciation generation system may use a recurrent neural network (RNN) model to predict syllabification and a stress pattern for word pronunciations and provide the syllabifications and stress patterns to another system, e.g., an ASR system, a TTS system, or both. The pronunciation generation system may provide a word spelling, a phoneme sequence, or both to the recurrent neural network as input. In some examples, the pronunciation generation system may use a long short-term memory (LSTM) recurrent neural network model to predict a stress pattern for a particular word given the pronunciation, spelling, or both, of the particular word.

The pronunciation generation system may use a finite state transducer (FST) technique to constrain the output of the recurrent neural network. For instance, the pronunciation generation system may have rules for word pronunciations for a particular language and apply the rules, using a finite state transducer technique, to output from the recurrent neural network.

The pronunciation generation system may provide output generated by the recurrent neural network, e.g., output that indicates the stress pattern and syllabification, to a TTS system, an ASR system, or both. In some examples, the pronunciation generation system may dynamically generate pronunciations or stress information in response to data received from a TTS system or an ASR system. For example, when a TTS system determines that there is not a pronunciation available in a dictionary for a particular word, the TTS system may request pronunciation data from the pronunciation generation system. In response, the TTS system receives pronunciation data for the particular word and uses the pronunciation data to generate an audio signal with an utterance of the particular word.

In general, one innovative aspect of the subject matter described in this specification can be embodied in methods that include the actions of determining, by one or more computers, spelling data that indicates the spelling of a word, providing, by the one or more computers, the spelling data as input to a trained recurrent neural network, the trained recurrent neural network being trained to indicate characteristics of word pronunciations based at least on data indicating the spelling of words, receiving, by the one or more computers, output indicating a stress pattern for pronunciation of the word generated by the trained recurrent neural network in response to providing the spelling data as input, using, by the one or more computers, the output of the trained recurrent neural network to generate pronunciation data indicating the stress pattern for a pronunciation of the word, and providing, by the one or more computers, the pronunciation data to a text-to-speech system or an automatic speech recognition system. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Providing the spelling data as input to the trained recurrent neural network may include providing the spelling data as input to a trained long short-term memory recurrent neural network. Receiving the output indicating the stress pattern for pronunciation of the word generated by the trained recurrent neural network may include receiving the output indicating the stress pattern for pronunciation of the word generated by the trained long short-term memory recurrent neural network in response to providing the spelling data as input. Using, by the one or more computers, the output of the trained recurrent neural network to generate the pronunciation data indicating the stress pattern for the pronunciation of the word may include using the output to generate the pronunciation that indicates at least one primary stress location. Using, by the one or more computers, the output of the trained recurrent neural network to generate the pronunciation data indicating the stress pattern for the pronunciation of the word may include using the output to generate the pronunciation that indicates a sequence of phones for the word with stress and syllable divisions and stress values.

In some implementations, the method may include determining, by the one or more computers, pronunciation data that indicates at least one stress location for the word. Providing, by the one or more computers, the spelling data as input to the trained recurrent neural network may include providing the spelling data and the pronunciation data as input to the trained recurrent neural network. Receiving the output indicating the stress pattern for pronunciation of the word generated by the trained recurrent neural network may include receiving the output indicating the stress pattern for pronunciation of the word generated by the trained recurrent neural network in response to providing the spelling data and the pronunciation data as input. Providing, by the one or more computers, the spelling data as input to the trained recurrent neural network may include providing a plurality of input vectors for the spelling data as input to the trained recurrent neural network, each of the plurality of input vectors indicating a particular character from the spelling data or filler. Receiving the output indicating the stress pattern for pronunciation of the word generated by the trained recurrent neural network may include receiving a plurality of output vectors that each indicate a probability distribution over a set of symbols, a combination of the plurality of output vectors indicating the stress pattern for pronunciation of the word generated by the trained recurrent neural network. Providing the plurality of input vectors may include providing a predetermined number of input vectors to the trained recurrent neural network as the input. Receiving the plurality of output vectors may include receiving the predetermined number of output vectors from the trained recurrent neural network as the output.

In some implementations, using, by the one or more computers, the output of the trained recurrent neural network to generate the pronunciation data indicating the stress pattern for the pronunciation of the word may include applying one or more constraints to the output to generate the pronunciation data indicating the stress pattern for the pronunciation of the word. Applying the one or more constraints to the output to generate the pronunciation data indicating the stress pattern for the pronunciation of the word may include using beam search on the output of the trained recurrent neural network to determine a path in the output with a highest likelihood of satisfying the one or more constraints, and using the path with the highest likelihood of satisfying the one or more constraints to generate the pronunciation data indicating the stress pattern for the pronunciation of the word. Applying the one or more constraints to the output to generate the pronunciation data indicating the stress pattern for the pronunciation of the word may include applying, by a network of finite state transducers, the one or more constraints to the output to generate the pronunciation data indicating the stress pattern for the pronunciation of the word. The method may include receiving, from the text-to-speech system, audio data generated using the pronunciation data in response to providing, by the one or more computers, the pronunciation data to the text-to-speech system. Providing, by the one or more computers, the pronunciation data to the text-to-speech system or an automatic speech recognition system may include providing, by the one or more computers, the pronunciation data to a text-to-speech system.

The subject matter described in this specification can be implemented in particular embodiments and may result in one or more of the following advantages. In some implementations, the systems and methods described below may generate pronunciations for a particular word when a pronunciation dictionary does not include an entry for the particular word. In some implementations, the systems and methods described below may apply rules to output from a neural network, e.g., a recurrent neural network or a long short-term memory recurrent neural network, to ensure that the output conforms to pronunciation rules the neural network may not have learned otherwise. In some implementations, the systems and methods described below may be more accurate than a rule-based model that does not use a neural network or a recurrent neural network. In some implementations, a system with a long short-term memory recurrent neural network may benefit from long-context behavior provided by the long short-term memory when generating a stress pattern for input data, e.g., a spelling, a pronunciation, or both.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A neural network, e.g., a long short-term memory (LSTM) recurrent neural network (RNN), may receive a spelling of a word as input and generate an output sequence with a stress pattern for the input word, a pronunciation for the input word, or both. For instance, the neural network generates an output sequence that indicates where a system that generates an audible synthesization of the input word should apply stress to the word and how much stress to apply to different parts of the word, e.g., stress values that indicate what the most prominent syllable is.

The neural network may provide the output sequence, which optionally indicates the pronunciation, to a system that generates an audible presentation of the word. For instance, the system may be a text-to-speech system that reads content to a user, such as an email. The system may provide a spelling of the word to the neural network and, in response, receive the output sequence with the stress pattern, including stress values, for the word.

In some implementations, the neural network may receive a spelling for a word and a pronunciation for the word as input. The neural network generates, as output, a stress pattern for the word.

In some implementations, a system may apply rules to the output of the neural network to constrain the output to valid linguistic patterns. The rules may be specific to a particular language, or may be applicable to multiple languages, or may be applicable to all languages. For instance, when the language is English, the system may determine a rule that indicates that the output sequence stress pattern should have one and only one primary stress location. An example of a general rule may indicate that every syllable must have exactly one vowel.

In some implementations, a system may store the output from the neural network in a dictionary. The system may use the dictionary for speech recognition, text-to-speech generation, or both.

Figure 1A:
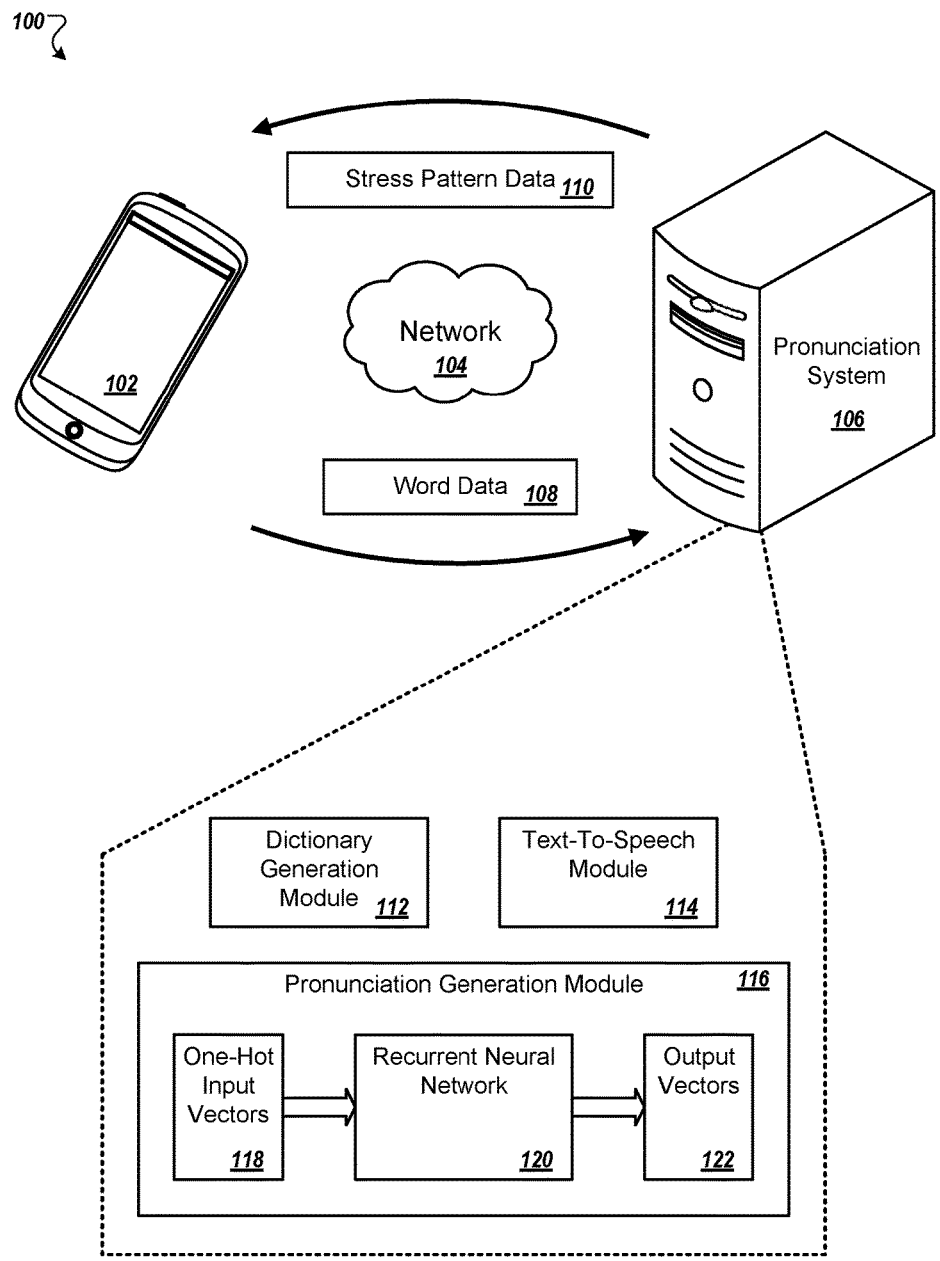
FIGS. 1A-B are an example of an environment in which a pronunciation system generates a stress pattern for a word.
Figure 1B:
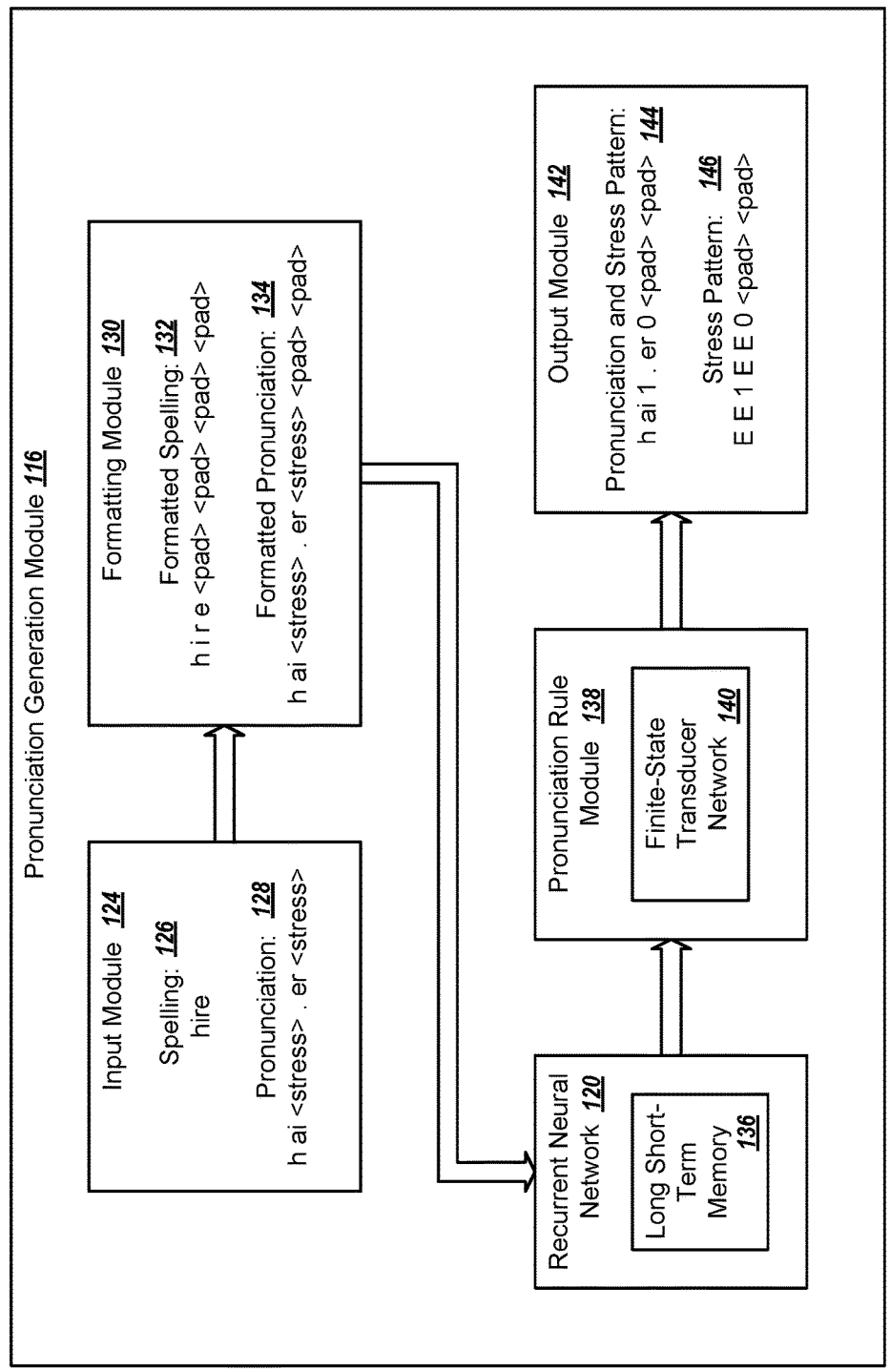

FIGS. 1A-B are an example of an environment 100 in which a pronunciation system 106 generates a stress pattern for a word. For example, as shown in FIG. 1A, the pronunciation system 106 may receive, from a user device 102, word data 108 which identifies a particular word as part of a request for stress pattern data 110 for the particular word. The word data 108 may include, for example, a spelling for the word.

The pronunciation system 106 provides the word data 108 to a pronunciation generation module 116, described in more detail below with reference to FIG. 1B. The pronunciation generation module 116 may generate a series of vectors that together represent the word data 108. For example, each letter or each grapheme of the word may be identified by a different vector. These vectors may be one-hot input vectors 118 for the word data 108, each with a "1" value at for a single dimension to indicate a specific letter or grapheme. For instance, when the word data is the word "hire", the pronunciation generation module 116 may generate a first one-hot vector that indicates that the first letter is "h", a second one-hot vector that indicates that the second letter is "i", and so one. The one-hot vectors may include one label for each letter in a particular alphabet for a language, one value for each phoneme for the language, filler labels, e.g., for padding or stress locations, a value for syllable boundaries, or a combination of two or more of these.

The pronunciation generation module 116 provides the one-hot input vectors 118 to a recurrent neural network 120 that may generate multiple output vectors 122 from the input vectors 118. Each of the output vectors 122 may indicate likelihoods for various labels representing characteristics a pronunciation. For example, the output vectors 122 may indicate likely stresses, syllable boundaries, phonemes, and so on. In some implementations, each of the output vectors 122 represents a distribution of probabilities across a predetermined set of labels. In some examples, at least some of the output vectors 122 may include values for stress value labels and indicate that a particular stress type, e.g., primary stress or secondary stress, is most likely for a portion of a word, e.g., a particular syllable.

The pronunciation system 106 may use the output vectors 122 to generate the stress pattern data 110 with stress values and provide the stress pattern data 110 to the user device 102. For instance, when a request from the user device 102 indicates that a pronunciation for the word data 108 will be used to generate speech, e.g., as part of a text-to-speech system, the pronunciation system 106 may provide the a stress pattern derived from the output vectors 122 such as the labels flagged in the vectors, to a text-to-speech module 114, included on the pronunciation system 106, that generates data for synthesized speech. The pronunciation system 106 then provides the data for the synthesized speech generated by the text-to-speech module 114 to the user device 102 for use to generate an utterance.

In some examples, the pronunciation system 106 generates the stress pattern data 110 for a pronunciation dictionary, e.g., stored on the pronunciation system 106, the user device 102, or both. The pronunciation system 106 provides word data to the pronunciation generation module 116 and receives, in response, the output vectors 122 or data representing the output vectors 122. For example, when the pronunciation generation module 116 provides the recurrent neural network 12 with four one-hot input vectors 118 that indicate the labels of "h", "i", "r", and "e", respectively, the pronunciation generation module 116 may receive output vectors 122 that indicate the most likely labels are "h", "ai", "1", ".", "er", and "0", where a stress value of "0" indicates no stress, a stress value of "1" indicates a primary stress location, a stress value of "2" indicates a secondary stress location, and "." indicates a syllable boundary. In this example, the output vectors 122 indicate a pronunciation that includes a stress pattern indicating the appropriate stress values for different portions of the word. The pronunciation generation module 116 then determines the most likely pronunciation, including the most likely stress pattern, based on the output vectors 122.

In some implementations, the pronunciation system 106 may include more or fewer stress values. For instance, the stress values may indicate a tone or stress level. In some examples, the pronunciation system 106 may include stress values of "0", "1", "2", "3", "4", and "5". The pronunciation system 106 may have a quantity of stress values based on a language for which the pronunciation system 106 is generating a stress pattern. The pronunciation system 106 may use any appropriate symbol to represent a stress value.

The pronunciation system 106 provides the determined pronunciation, to a dictionary generation module 112. The dictionary generation module 112 uses the pronunciation data, e.g., a string representing the highest-scoring labels from the output vectors 122, to create an entry for "hire" in the pronunciation dictionary, e.g., that maps the spelling of the word "hire" with the pronunciation that includes a stress pattern: "h ai 1. er 0". In some examples, the dictionary generation module 112 or the pronunciation system 106 may provide the entry to the user device 102, e.g., for use with an automatic speech recognition system.

FIG. 1B is an example of the pronunciation generation module 116 of FIG. 1A. In the example shown in FIG. 1B, the pronunciation generation module 116 includes a long short-term memory (LSTM) layer 136 recurrent neural network (RNN) 120. For instance, a recurrent neural network utilizes context of previous inputs while processing a current input using cyclic connections. The use of contextual information by the recurrent neural network 120 may make the recurrent neural network 120 well-suited for sequence modeling tasks, e.g., when analyzing a sequence of vectors that represent a word.

In some examples, the pronunciation generation module 116 may use at least one long short-term memory layer 136 to solve the vanishing gradient problem. For instance, the long short-term memory layer 136 may learn long-context behavior based on input data.

In some implementations, the long short-term memory layer 136 may generate a stress pattern, e.g., with stress values, for a given word or pronunciation. For example, an input module 124, included in the pronunciation generation module 116, receives pronunciation data 128 of the word "hire" as "h ai<stress>. er<stress>" in which "<stress>" indicates a placeholder for an unspecified stress value for the pronunciation of the word "hire" and "." indicates a syllable boundary.

A formatting module 130 receives the pronunciation data 128 and generates formatted pronunciation data 134. The formatted pronunciation data 134 may be a sequence of one-hot vectors with one vector for each label, e.g., each phone identifier, syllable divider, padding symbol, or other label, in the pronunciation data 128. The vectors may all have the same dimension, e.g., if labels are from a set of thirty-three possible labels, then the vectors each have thirty-three elements. Each one-hot vector may include zeros for all values except the corresponding label, e.g., having a value of one for the corresponding label. For instance, a first vector may include a value of one in a position corresponding to the label "h" and zeros for all remaining values. A second vector may include a value of one in a position corresponding to the label "ai" and zeros for all remaining values. A third vector may include a value of one in a position corresponding to the label of "<stress>" and zeros for all remaining values, and so on.

In some examples, the formatting module 130 may add padding to the formatted pronunciation data 134. For instance, the formatting module 130 may add padding in the form of additional input vectors to the beginning, the end, or both, of the formatted pronunciation data 134. The formatting module 130 may create additional one-hot vectors for the padding and add the vectors to the sequence of vectors for the input data. The padding one-hot vectors may include zeros for all values except a padding label.

The recurrent neural network 120 receives the formatted pronunciation data 134 from the formatting module 130 and generates output data. For instance, an input layer in the recurrent neural network 120 receives the formatted pronunciation data 134.

Figure 2A:
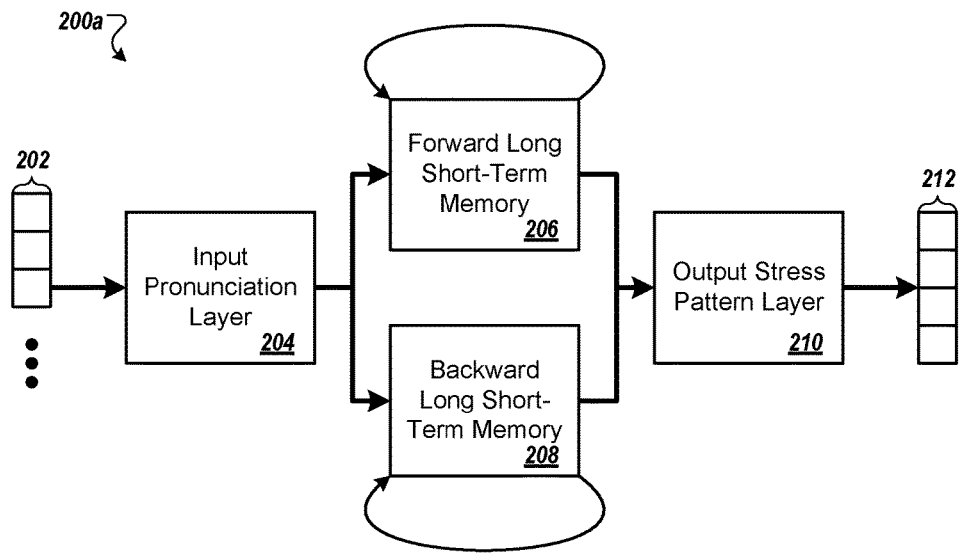
FIGS. 2A-C depict examples of recurrent neural networks that generate stress patterns.
Figure 2B:
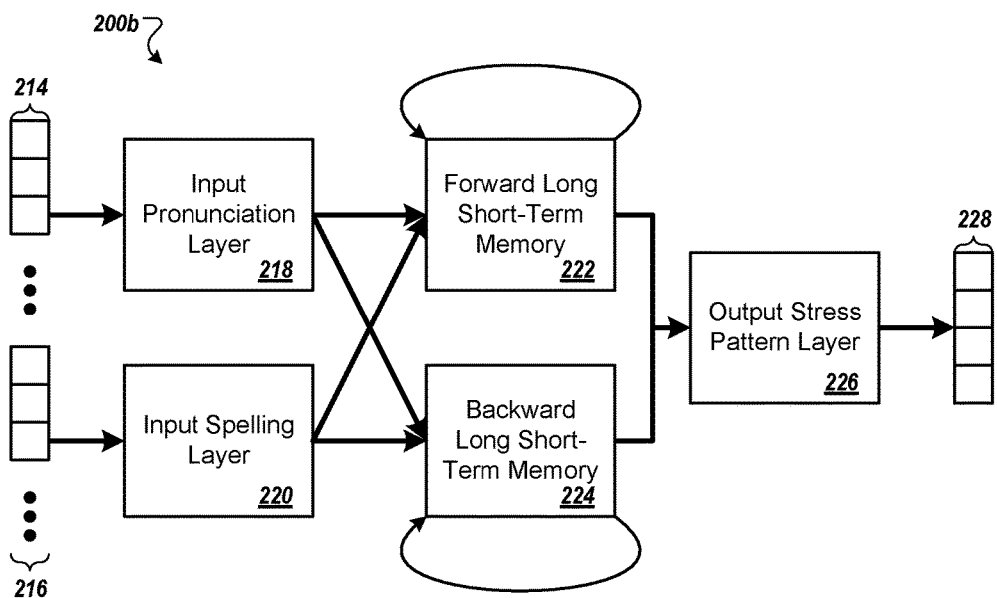
Figure 2C:
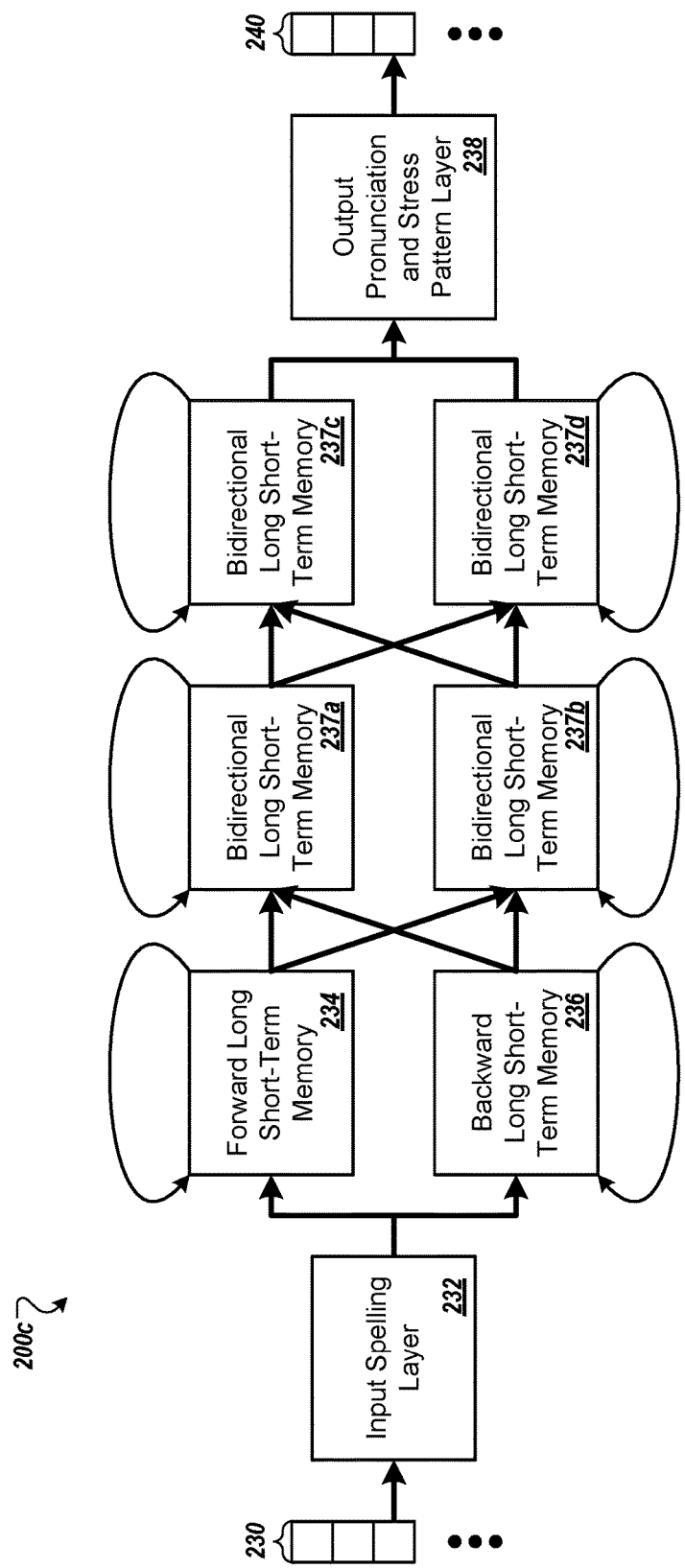

FIGS. 2A-C depict examples of recurrent neural networks that generate stress patterns, e.g., with stress values. For example, as shown in FIG. 2A, a first recurrent neural network 200a receives the formatted pronunciation data 134 as input data 202 and provides the input data 202 to an input pronunciation layer 204.

The input pronunciation layer 204 includes a predetermined number of units based on the language to which the input data 202 applies. For instance, the input pronunciation layer 204 may include thirty-three units when processing input data 202 for American English words such that each of the units corresponds to a value in an input vector, e.g., a label in a one-hot input vector. Each of the thirty-three elements can have a predetermined mapping to a different label. For example, the first value input to the input pronunciation layer 204 may correspond to the letter "a," the second value input to the input pronunciation layer 204 may correspond to the letter "b," and so on.

The input pronunciation layer 204 provides data to both a forward long short-term memory (LSTM) 206 and a backward long short-term memory (LSTM) 208 included in the first recurrent neural network 200a. Both the forward LSTM 206 and the backward LSTM 208 may be unrolled so that there is one state of each layer for each item in the input data 202. For instance, each of the LSTMs may include one state for each one-hot vector in the input sequence of one-hot vectors that form the input data 202.

The forward LSTM 206 may process data from the input data 202 moving forward through the sequence of data represented by the input data 202. For instance, the forward LSTM 206 may begin with the first one-hot vector for the label "h", then process the second one-hot vector for the label "ai", and so on. When the formatted pronunciation data 134 includes padding at the beginning of the input data 202, e.g., when two "<pad>" values are at the beginning of the data instead of the end of the data to represent padding, the forward LSTM 206 begins by processing both of the one-hot vectors for the two padding labels and then starts processing for the label "h" and the remaining one-hot vectors.

The recurrent neural network 200 may use any appropriate value to represent padding. For example, the recurrent neural network 200 may use a value of "<empty>" to represent padding instead of "<pad>". In some examples, the recurrent neural network 200 may use a value for padding that is not the same as a potential input value for the recurrent neural network 200. For instance, when the recurrent neural network 200 includes "i" as an input symbol, the recurrent neural network 200 will use a value other than "i" to represent padding.

The backward LSTM 208 may process data from the input data 202 moving backward through the sequence of data represented by the input data 202. For example, when the formatted pronunciation data 134 does not include padding, the backward LSTM 208 may first receive a one-hot vector for the label "<stress>", then process a one-hot vector for the label "er", and so on. When the formatted pronunciation data 134 includes padding at the end of the input data 202, the backward LSTM 208 processes both one-hot vectors for the two padding labels and then begins processing of the one-hot vector with a "<stress>" label and the remaining one-hot vectors.

In some implementations, the pronunciation generation module is trained to receive inputs for and provide outputs for a single language. Thus, while the overall topology of the neural network may be the same or similar for each language, the dimension of the input layers may differ according to the number of symbols used in the language for different letters or phonemes. Similarly, the dimension of the output layer may vary to accommodate the different labels for stress that may be appropriate for different languages.

The recurrent neural network 120 may include a number of memory cell units in each of the LSTMs that is appropriate for the language being processed. For instance, each long short-term memory layer 136 may include a number of memory cell units determined using a number of words for the language, a number of pronunciation and stress symbols for the language, or both. In some examples, the forward LSTM 206, the backward LSTM 208, or both, may include one-hundred twenty-eight memory cell units.

The number of memory cell units in each of the LSTMs may be the same. For instance, both the forward LSTM 206 and the backward LSTM 208 may include one-hundred twenty-eight memory cell units.

The forward LSTM 206 and the backward LSTM 208 provide data to an output stress pattern layer 210 that generates output data 212 as a result of the first recurrent neural network 200a processing the input data 202. In some implementations, the output stress pattern layer 210 is a soft-max output layer, e.g., one with nodes that pass the maximum value of multiple input values. The output stress pattern layer 210 may be any appropriate type of output layer, e.g., with any appropriate type of function. For instance, the output stress pattern layer 210 may be a rectified linear activation function output layer.

For instance, the output stress pattern layer 210 may create a sequence of output vectors that indicate a likely stress pattern for the particular word "hire". The output vectors may each include one value for primary stress, one value for secondary stress, one value for no stress, and one value that indicates that a corresponding string from the pronunciation should not be replaced, e.g., at a corresponding phoneme location identified by the input data 202. The values in an output vector may represent a distribution of probabilities that the different corresponding labels are appropriate. For example, an output vector of [0.7, 0.1, 0.1, 0.1] could indicate a high likelihood, e.g., a 70% likelihood, that primary stress is appropriate for a particular input vector, while indicating a much lower likelihood that any of the other labels are applicable to the input vector. For instance, the recurrent neural network 120 may generate, for each of the output vectors, a probability distribution that indicates likelihoods that the various labels represented by the output vector is correct. The sum of the values for a single output vector may equal one, e.g., one-hundred percent. In some examples, the output stress pattern layer 210 generates a single output vector for each input vector in the input data 202.

Returning to FIG. 1B, the recurrent neural network 120 may provide the output data 212 to a pronunciation rule module 138, which determines an appropriate stress pattern from the output data 212 of the recurrent neural network 120. The pronunciation rule module 138 may interpret the output vectors from the recurrent neural network 120, and may select a label that corresponds with a highest value in an output vector as the corresponding output for that output vector. The pronunciation rule module 138 may additionally or alternatively perform more sophisticated processing to ensure that the stress pattern indicated complies with the rules of a language. For example, the pronunciation rule module 138 may constrain the stress pattern for a word to have one and only one primary stress. As discussed further below, the pronunciation rule module 138 may model the valid stress patterns for a language as a network of finite state transducers (FST) 140, and may perform a beam search algorithm to determine which path through the network of finite state transducers 140 best fits the probability distributions indicated by the output of the recurrent neural network

120. The best-fit path through the network of finite state transducers 140 can represent a stress pattern, where the sequence of nodes traversed in the best-fit path through the network of finite state transducers 140 represents a sequence of stress types for the syllables in the word. This stress pattern can be selected as being most likely correct for the word being evaluated.

The pronunciation rule module 138 provides the stress pattern for the word to an output module 142 that formats the output data 212. For instance, the output module 142 receives data indicating the stress pattern that the pronunciation rule module 138 determines is most likely to be correct given the vectors in the output data 212. The output module 142 generates a stress pattern data 146, e.g., with stress values, using the output data 212. The output module 142 may generate a stress pattern data 146 represented by a vector, a string, or any other appropriate data type.

In the illustrated example, the pronunciation data 128 for the word "hire" includes the sequence of symbols "h ai<stress>. er<stress>", which indicates the phones of the word, the syllable boundaries, and placeholders for unspecified stress values of the syllables. For this input, the output module 142 generates stress pattern data 146 of "E E 1 E E 0" where each value in the stress pattern data 146 corresponds to a value in the pronunciation data 128, the formatted pronunciation data 134, or both. For instance, the recurrent neural network 120 uses all of the values from the formatted pronunciation data 134 to determine stress values for the positions in the formatted pronunciation data 134 labelled with "<stress>". In the examples shown, the value of "E" may represent that the corresponding value from the pronunciation data should not be replaced, e.g., when the pronunciation data 128 and the stress pattern data 146 are combined, the first value should be "h", the second value should be "ai", the third value should be "1", and so on.

The output module 142 may combine the pronunciation data 128 with the stress pattern data 146 to create a final output for the pronunciation generation module 116. For instance, the output module 142 may generate a final output of "h ai 1. er 0" for the pronunciation data 128 "h ai<stress>. er<stress>" that places stress values in the stress locations. As noted above, the stress value of "1" value indicates primary stress, and the stress value of "0" value represents no stress.

In some implementations, the recurrent neural network 120 may be trained to receive and process spelling data as input in addition to, or instead of, pronunciation data. For instance, the input module 124 may receive spelling data 126 that indicates a spelling of the word "hire". The formatting module 130 receives the spelling data 126 from the input module 124 and formats the spelling data 126 to create formatted spelling data 132.

The formatting module 130 may add padding to the formatted spelling data 132. The formatting module 130 may add leading padding, trailing padding, or both, to the formatted spelling data 132, the formatted pronunciation data 134, or both, so that the lengths of both sequences are the same, e.g., are a predetermined length. For instance, the formatting module 130 may add one-hot vectors to one of the sequences for the formatted spelling data 132, the formatted pronunciation data 134, or both, so that the lengths of the sequences are the same. The formatting module 130 may add padding to the beginning of the data, the end of the data, or both. When pronunciation data and spelling data are both provided, there is generally no requirement that the two types of data be aligned. Thus, while the letters and phones are each provided in order, the position of a letter of the word in the input sequence may be independent of the position of the corresponding phone in the input sequence.

The formatting module 130 may select the predetermined length as twice the length of the spelling, twice the length of the pronunciation, or another appropriate value. In the example shown in FIG. 2B, the sequence for the formatted spelling data 132 has a length of eight labels, e.g., eight one-hot vectors, and the sequence for the formatted pronunciation data 134 has a length of eight labels, e.g., eight one-hot vectors. The formatting module 130 may determine which data is longer, e.g., includes more labels, and select the predetermined length as twice the longer of the two lengths.

In some examples, the formatting module 130 may create a one-hot vector for each character in the spelling data 126. For instance, the formatting module 130 may create a first one-hot vector for the character "h", a second one-hot vector for the character "i", and so on. The formatting module 130 may create one-hot vectors for padding labels.

The formatting module 130 provides the formatted spelling data 132 and the formatted pronunciation data 134 to the recurrent neural network 120 as input data. For example, as shown in FIG. 2B, a second recurrent neural network 200b receives the formatted pronunciation data 134 as input pronunciation data 214 for an input pronunciation layer 218 and receives the formatted spelling data 132 as input spelling data 216 for an input spelling layer 220.

The size of the input pronunciation layer 218 and the size of the input spelling layer 220 may be selected based on a corresponding language for which the second recurrent neural network 200b is trained. For instance, the input pronunciation layer 218 may include twenty-nine units and the input spelling layer may include one-hundred six units when processing input data for American English words.

The input pronunciation layer 218 and the input spelling layer 220 together form the input layer of the second recurrent neural network 200b. Both input layers 218, 220 provide data to both a forward LSTM 222 and a backward LSTM 224. The forward LSTM 222 and the backward LSTM 224 may be similar to the forward LSTM 206 and the backward LSTM 208, respectively, described above with reference to FIG. 2A. For example, the forward LSTM 206, the backward LSTM 208, or both, may include one-hundred twenty-eight memory cell units.

The forward LSTM 222 and the backward LSTM 224 process the data from the input pronunciation layer 218 and the input spelling layer 220 at the same time to generate data to provide to an output stress pattern layer 226. For instance, the input pronunciation layer 218 receives data for a first one-hot pronunciation vector, e.g., from the input pronunciation data 214, to generate first pronunciation data and the input spelling layer 220 receives data for a first one-hot spelling vector, from the input spelling data 216, to generate first spelling data. The forward LSTM 222 receives both the first pronunciation data and the first spelling data and uses both the first pronunciation data and the first spelling data as input data to generate first forward LSTM output for the output stress pattern layer 226. Similarly, the backward LSTM 224 receives both the first pronunciation data and the first spelling data and uses both the first pronunciation data and the first spelling data as input data to generate first backward LSTM output for the output stress pattern layer 226. The forward LSTM layer 222 may receive data from the forward LSTM layer's 222 output from the previous time step, if there is one. The backward LSTM layer 224 may receive data from the backward LSTM layer's 224 output from the next time step, if there is one. This bidirectional flow of information between time steps is possible because time steps are processed in parallel rather than serially in time.

A "time step" is a symbol in the sequence of symbols that the recurrent neural network 200 is processing. For example, when the second recurrent neural network 200*b* is processing pronunciation data input "h ai<stress>. er<stress>" and spelling data input "<pad> <pad>h i r e", the penultimate time step is when the input layers are set to "er" and "r" and the output layer should produce "E" and the last time step is when the input layers are set to "<stress>" and "e" and the output layer should produce "0".

Since the forward LSTM 222 and the backward LSTM 224 process data from both the input pronunciation layer 218 and the input spelling layer 220 at the same time, and the network architecture requires all input vectors to be defined at each time step and produces exactly one output vector per time step, the input data or the output data, or both, may include padding so that two or three of the input pronunciation data 214, the input spelling data 216, and the output data 228 are the same length, e.g., include the same number of vectors. For instance, the formatting module 130 of FIG. 1B may determine whether the formatted spelling data 132 or the formatted pronunciation data 134 is a shorter sequence of vectors and pad the shorter sequence of vectors so that both data sets are the same length, e.g., have the same number of vectors. In some examples, the formatting module 130 may add padding to both data sets so that the formatted spelling data 132 and the formatted pronunciation data 134 are the same length.

In some implementations, the formatting module 130 may add padding to two of the sequences during training, selected from the two input sequences and the output sequence. For example, the formatting module 130 may add padding to the pronunciation input data and the output data, e.g., that represents the stress pattern. Since the recurrent neural network 200*b* is trained with padded output sequences, the recurrent neural network 200*b*, during runtime, may automatically generate output sequences with padding when the formatting module 130 adds padding to one of the input sequences.

Returning to FIG. 2B, the input pronunciation data 214 and the input spelling data 216 do not have any information about the alignment between the input pronunciation data 214 and the input spelling data 216. Rather, the second recurrent neural network 200*b* must learn, during training, to propagate evidence about stress from the input spelling data 216 forwards or backwards in time. For instance, in languages like Greek where stress may be marked with vowel diacritics, the second recurrent neural network 200*b* must learn an implicit alignment model between written vowels in the input spelling data 216 and their corresponding stress markers in the input pronunciation data 214.

The output stress pattern layer 226 uses the first forward LSTM output and the first backward LSTM output to generate output data 228 that corresponds to the processed input data. For instance, the output stress pattern layer 226 generates a first output vector that corresponds to the first pronunciation data, e.g., a first pronunciation vector. The output stress pattern layer 226 may combine the outputs from the first forward LSTM 222 and the first backward LSTM 224 to create a single input for the output stress pattern layer 226.

The second recurrent neural network 200*b* continues to process the input pronunciation data 214 and the input spelling data 216 until all data has been processed and the output stress pattern layer 226 has generated all of the output data 228. For instance, the output stress pattern layer 226 generates a sequence of output vectors such that each of the vectors in the sequence corresponds to one of the vectors in the input pronunciation data 214 and one of the vectors in the input spelling data 216, e.g., each of the sequences of vectors includes the same number of vectors.

The output stress pattern layer 226 generates the output data 228 that represents the stress pattern for the input data, e.g., the particular word "hire". For example, each vector in the output data 228 may include one value for primary stress, one value for secondary stress, one value for no stress, and one value that indicates that a corresponding string from the pronunciation should not be replaced.

Returning to FIG. 1B, the recurrent neural network 120 may provide the output data 228 to the pronunciation rule module 138, which determines an appropriate stress pattern for the word using the output data 228 of the recurrent neural network 120. The pronunciation rule module 138 may interpret the output vectors from the recurrent neural network 120, and may select a label that corresponds with a highest value in an output vector as the corresponding output for that output vector, as described in more detail below.

The pronunciation rule module 138 provides the stress pattern for the word to an output module 142 that formats the stress pattern. For instance, the output module 142 receives the output vectors from the long short-term memory 136 as the output data 228. The output module 142 generates stress pattern data 146 using the output data 228. The output module 142 may generate stress pattern data 146 represented by a vector, a string, or any other appropriate data type.

In some implementations, the recurrent neural network 120 may receive data for only the spelling data 126 as input. For instance, the input module 124 may receive the spelling data 126 for the word "hire" and provide the spelling data to the formatting module 130.

The formatting module 130 formats the spelling data 126 for input to the recurrent neural network 120. For instance, the formatting module 130 generates one-hot input vectors for the spelling data 126 to provide to the recurrent neural network 120 as input.

The formatting module 130 may add padding to the beginning, the end, or both, of the spelling data 126 to create the formatted spelling data 132 as input for the recurrent neural network 120. For example, the formatting module 130 may add padding to the spelling data 126 so that the input sequences for the recurrent neural network 120 has a length that is greater than the number of labels in an output sequence other than padding labels.

In some examples, the formatting module 130 may add additional one-hot vectors to the formatted spelling data 132 so that the number of input one-hot vectors is double the length of the string in the spelling data 126. For instance, when the input string represented by the spelling data 126 is the word "hire" with a length of four labels, the formatting module 130 may create formatted spelling data 132 with a total of eight one-hot vectors, four one-hot vectors for the four labels that represent the spelling of the word "hire" and four one-hot vectors for padding, e.g., represented by flagging a value for a "<pad>" label in the vector.

The formatting module 130 provides the formatted spelling data 132 to the recurrent neural network 120. For instance, the formatting module 130 provides the formatted spelling data 132 as input data 230 to a third recurrent neural network 200*c* shown in FIG. 2C.

In some implementations, the formatting module 130 may add padding to the input vectors because the sequence of output vectors, e.g., the output pronunciation, might be longer than the sequence of input vectors, e.g., the input spelling. For the third recurrent neural network 200c, the input sequences and the output sequences all must be the same length for bidirectional LSTMs.

Since the third recurrent neural network 200c does not know the exact length of the sequence of output vectors necessary to predict the output values, the formatting module 130 adds padding to the sequence of input vectors to double the length of the sequence of input vectors. The formatting module 130 may add any appropriate number of padding vectors to the series of input vectors. For instance, the formatting module 130 may add padding to triple or square the length of the input.

The third recurrent neural network 200c provides the input data 230 to an input spelling layer 232. The input spelling layer 232 generates data, using the input data 230, and provides the data to a forward LSTM 234 and a backward LSTM 236.

The input spelling layer 232 may have a number of cells selected based on the language for the input data 230. For instance, when the language is American English, the input spelling layer 232 may have eighty-six cells, e.g., where each cell corresponds to either a lowercase letter, an uppercase letter, a digit, a padding value, or a symbol such as "\", "ø", "CE", or "ü" when some of the symbols may be found in technical terms, names, Internet identifiers, or foreign or loan words.

The forward LSTM 234 and the backward LSTM 236 each provide data to subsequent bidirectional LSTM layers 237a-d in the third recurrent neural network 200c, e.g., at the same time. For instance, the forward LSTM 234 and the backward LSTM 236 may each process the data received from the input spelling layer 232 to generate respective output and provide the respective output to both a first bidirectional LSTM 237a and a second bidirectional LSTM 237b.

The first bidirectional LSTM 237a and the second bidirectional LSTM 237b may use both sets of output from the initial LSTM layers 234 and 236 as a single set of input data. For instance, the first bidirectional LSTM 237a may receive one vector from the forward LSTM 234 and one vector from the backward LSTM 236 and concatenate the two vectors to create a single input vector.

The forward LSTM 234, the backward LSTM 236, and all of the bidirectional LSTMs 237a-d may be unrolled so that there is one state of each layer for each item in the input data 230. For instance, each of the LSTMs may include one state for each one-hot vector in the input sequence of one-hot vectors that form the input data 230. Each of the bidirectional LSTMs 237a-d may contain one or more pairs of forward and backward LSTM layers.

The forward LSTM 234 may process data from the input data 230 moving forward through the sequence of data represented by the input data 230. For instance, the forward LSTM 234 may begin with the first one-hot vector for the label "h", then process the second one-hot vector for the label "a", and so on. When the formatted spelling data 132 includes padding at the beginning of the input data 230, e.g., the four "<pad>" values are at the beginning of the data instead of the end of the data, the forward LSTM 234 begins by processing all of the one-hot vectors for the four padding labels and then starts processing for the label "h" and processing the remaining one-hot vectors.

The backward LSTM 236 may process data from the input data 230 moving backward through the sequence of data represented by the input data 230. For example, when the formatted pronunciation data 134 does not include padding, the backward LSTM 236 may first receive a last one-hot vector for the label "e", then process a penultimate one-hot vector for the label "r", and so on. When the formatted pronunciation data 134 includes padding at the end of the input data 230, the backward LSTM 236 processes all one-hot vectors for the four padding labels and then begins processing of the one-hot vector with an "e" label and the remaining one-hot vectors.

The bidirectional LSTMs 237a-d process data in both the forward direction and the backward direction at the same time. For instance, each of the bidirectional LSTM layers 237a-d process data generated directly or indirectly by the forward LSTM 234 and data generated directly or indirectly by the backward LSTM 236.

The pronunciation system 106 may include a number of memory cell units in each of the LSTMs 234a-c and 236a-c based on the language being processed. For instance, the pronunciation generation module 116 may include a number of memory cell units using a number of words for the language, a number of pronunciation and stress symbols for the language, or both. In some examples, the forward LSTMs 234a-c, the backward LSTMs 236a-c, or both, may include sixty-four memory cell units.

The second forward LSTM 234b and the second backward LSTM 236b each generate data and provide the data to both a third forward LSTM 234c and a third backward LSTM 236c. The third forward LSTM 234c uses the data from both the second forward LSTM 234b and the second backward LSTM 236b to generate data for an output pronunciation and stress pattern layer 238. Similarly, the third backward LSTM 236c uses the data from both the second forward LSTM 234b and the second backward LSTM 236b to generate data for the output pronunciation and stress pattern layer 238.

The output pronunciation and stress pattern layer 238 uses both sets of data from the third forward LSTM 234c and the third backward LSTM 236c as input to generate a single set of output data 240. For instance, the output pronunciation and stress pattern layer 238 concatenates the data from the third forward LSTM 234c with the data from the third backward LSTM 236c and uses the concatenated data as input. The output pronunciation and stress pattern layer 238 uses the concatenated data to generate the output data 240.

The output pronunciation and stress pattern layer 238 may include one cell for each pronunciation label in a target language, e.g., for each phone in the target language, one label for each different type of stress value, one label for syllable boundaries, one label for padding, or a combination of two or more of these. For instance, the output pronunciation and stress pattern layer 238 may include thirty-three cells and generate an output vector 240 that includes thirty-three values such that a sum of the values equals one, e.g., one-hundred percent.

The values in the output vector 240 may indicate a probability distribution that represents a likelihood that the corresponding label is an output value. For instance, each of the values for the output vector may represent a corresponding likelihood that the respective label is an output value for the output vector 240. The values in the output vector 240 may be any appropriate values to represent a single choice of a symbol. For example, the pronunciation system 106 may apply an argmax function to the output vector 240 to select a symbol represented by one of the values in the output vector 240, e.g., and break ties using any appropriate method.

In some implementations, e.g. when a rectified linear activation function is used, e.g., rather than soft-max, the output vector's values might not represent a probability distribution. For instance, when the output pronunciation and stress pattern layer 238 uses a rectified linear activation function, the output vector 240 may represent the activations of that layer in the network. The third recurrent neural network 200c, or another component of the pronunciation system 106, may use the activations to determine a most likely label for the output vector 240.

In some examples, the pronunciation system 106 may convert the values in an output vector 240 to a probability distribution using any appropriate technique. For example, the pronunciation system 106 may normalize the values in the output vector 240 or exponentiate the values in the output vector 240 and then normalize the exponentiated values.

The output data 240 generated by the output pronunciation and stress pattern layer 238 includes pronunciation and stress pattern data 144, shown in FIG. 1B. For instance, the recurrent neural network 120 may use the formatted spelling data 132 "h i r e <pad> <pad> <pad> <pad>" to generate the pronunciation and stress pattern data 144 "h ai 1. er 0<pad> <pad>".

In some examples, the recurrent neural network 120 may generate the output data 240 that includes a sequence of vectors, e.g., eight output vectors given the example for the word "hire" above, and provide the sequence of vectors to the pronunciation rule module 138 or the output module 142. The pronunciation rule module 138 or the output module 142 may use the sequence of vectors to determine the most likely label for each output vector and the pronunciation and stress pattern for the word, e.g., "hire".

The output module 142 may format the most likely labels, e.g., for the dictionary generation module, the text-to-speech module 114, the user device 102, or a combination of two or more of these. For instance, the output module 142 may select, from each vector in the sequence of output data, a most likely label, e.g., a label with the highest probability value. The output module 142 uses the most likely label from each vector in the sequence of output data to create a string or another data structure to represent the stress pattern for the input word.

Table 1 below includes some example input sequences and output sequences, both with padding, for the pronunciation generation module 116.

TABLE 1

| Pronunciation Only Input for the First Recurrent Neural Network 200a | |
|---|---|
| Pronunciation Input | h ai <stress> . er <stress> |
| Stress Pattern Output | E E 1 E E 0 |
| Pronunciation and Spelling Input for the Second Recurrent Neural Network 200b | |
| Pronunciation Input | h ai <stress> . er <stress> |
| Spelling Input | <pad> <pad> h i r e |
| Stress Pattern Output | E E 1 E E 0 |
| Pronunciation and Spelling Input for the Second Recurrent Neural Network 200b | |
| Pronunciation Input | <pad> <pad> s er <stress> ch |
| Spelling Input | s e a r c h |
| Stress Pattern Output | <pad> <pad> E E 1 E |
| Spelling Only Input for the Third Recurrent Neural Network 200c | |
| Spelling Input | h i r e <pad> <pad> <pad> <pad> |
| Stress Pattern Output with Pronunciation | h ai 1 . er 0 <pad> <pad> |

In some implementations, the recurrent neural network 120 may provide data to a pronunciation rule module 138 instead of the output module 142. The pronunciation rule module 138 applies rules, specific to a particular language or general to any language, to the output of the recurrent neural network 120 to ensure that the output of the pronunciation generation module 116 does not violate the rules. The rules may indicate valid stress patterns for output data. For example, the pronunciation rule module 138 may include a rule, specific to a particular language or group of languages, which indicates that exactly one primary stress location should be included in each word, another rule that disallows placing stress on the final syllable of a pronunciation, or any other appropriate type of rule.

When processing data for the corresponding languages, the pronunciation rule module 138 determines whether the most likely values in the output from the recurrent neural network 120 align with the rules. For instance, the pronunciation rule module 138 may perform a beam search on all of the vectors included in an output sequence to determine a best path in the output sequence such that the best path indicates the labels to select from each of the vectors in the sequence, whether or not the labels are the most likely labels or another label with a non-zero likelihood.

In some examples, the pronunciation rule module 138 may constrain the output from the recurrent neural network 120 to only valid stress patterns for a language. The pronunciation rule module 138 may use a network of finite state transducers (FST) 140 in which each transition between two nodes represents a particular stress value. The network of finite state transducers 140 can disallow invalid stress sequences, such as transitions from a primary stress value to another primary stress value. To identify the stress pattern that best suits a word, the pronunciation rule module 138 may use output from the recurrent neural network 120 to evaluate different paths through the network of finite state transducers 140. For example, the pronunciation rule module 138 can perform a beam search to identify the path having the highest likelihood according to the probability distributions indicated by the output of the recurrent neural network 120. The transitions along this path, which may be determined to have the highest probability, lowest cost, or satisfy other criteria, can represent a stress pattern considered to be most appropriate for the word. The pronunciation rule module 138 may use any appropriate technique to constrain the output from the recurrent neural network 120.

In some implementations, the output of the recurrent neural network 120, e.g., the output of the long short-term memory layer 136, may be a weighted FST. The pronunciation rule module 138 may intersect the weighted FST from the recurrent neural network 120 with the network of finite state transducers 140 included in the pronunciation rule module 138 and pick the most probable path as the final stress pattern. The pronunciation rule module 138 may select the most probable stress pattern given the output from the long short-term memory layer 136 that is also a valid stress pattern.

The pronunciation rule module 138 provides output to the output module 142. For instance, the pronunciation rule module 138 provides the final stress pattern to the output module 142.

The output module 142 may format the final stress pattern, e.g., for a destination, provide the final stress pattern to another component of the pronunciation system 106 or another system, or both. For instance, the output module 142 may store the final stress pattern in a dictionary database and provide the final stress pattern to the text-to-speech module 114.

In some implementations, the pronunciation system 106 may generate a dictionary using the dictionary generation module 112, e.g., while in an offline module. For instance, the pronunciation generation module 116 may generate pronunciations, stress patterns, or both, for multiple words. The dictionary generation module 112 may store the stress patterns, pronunciations, or both, in a database for later use. The pronunciation system 106 may later provide some of the dictionary data from the database to the user device 102, e.g., when online.

In some implementations, the user device 102 may include the pronunciation generation module 116. For instance, the user device 102 may receive a request to perform a text-to-speech process for an email message. The user device 102 may provide all of the words from the email message to the pronunciation generation module 116 or only the words that are not included in a local pronunciation dictionary stored on the user device 102.

The user device 102 uses the pronunciation information that includes a stress pattern received from the pronunciation generation module 116 to generate an audio signal that includes synthesized utterances of the words included in the email message and provides the audio signal to a speaker for presentation. For instance, the user device 102 may include a text-to-speech module that uses the stress pattern received from the pronunciation generation module 116, whether included on the user device 102 or the pronunciation system 106, to generate a synthesized utterance of the word and provides the synthesized utterance to the speaker for playback.

In some implementations, a device may determine that a stress pattern for a word is not included in a dictionary and provide the word to the pronunciation generation module 116 in response. For instance, the user device 102 may determine that a stress pattern for the word "hire" is not included in a local pronunciation dictionary stored in a memory of the user device 102 and provide the word "hire" to the pronunciation generation module 116, e.g., included on the user device 102 or the pronunciation system 106. In response, the user device 102 receives a stress pattern for the word and, optionally, a pronunciation for the word. The user device 102 may use the stress pattern and a pronunciation for the word to generate the audio signal that includes the synthesized utterance of the word.

In some implementations, the pronunciation system 106 may receive the word from the user device 102, e.g., as the word data 108. The pronunciation system 106 determines that the word is not included in a pronunciation dictionary or that a stress pattern for the word is otherwise not available and, in response, provides the word or data representing the word to the pronunciation generation module 116. For instance, the pronunciation system 106 may provide a pronunciation for the word, a spelling for the word, or both, to the pronunciation generation module 116.

The pronunciation system 106 receives a stress pattern for the word from the pronunciation generation module 116, e.g., that the pronunciation generation module 116 generated using the data representing the word. The pronunciation system 106 provides the stress pattern to the user device 102 as the stress pattern data 110. The user device may use the stress pattern data 110 as part of a text-to-speech process or as part of an automatic speech recognition process.

In some implementations, the pronunciation system 106 trains the recurrent neural network 120. For instance, FIGS. 2A-C show the direction of data moving through the corresponding recurrent neural networks 200*a-c* during a forward pass. The recurrent neural networks 200*a-c* perform backpropagation as part of the training process in the opposite direction of all of the arrows.

The pronunciation system 106 may randomly initialize weights for the recurrent neural network 120. For instance, the weights may be randomly generated between −0.01 and 0.01, inclusive. The pronunciation system 106 may train the recurrent neural network 120 with distributed asynchronous gradient descent, e.g., with a learning rate of 0.00005. In some examples, the pronunciation system 106 may stop training after the best held-out set accuracy had not changed for a predetermined period of time, e.g., at least three hours.

The pronunciation system 106 may use a cross-entropy loss where each input is a one-hot encoding of an input label and a target is the associated stress marker, e.g., stress value. For instance, the pronunciation system 106 may use a cross-entropy loss for the first recurrent neural network 200*a* with each input being a one-hot encoding of a phoneme and a target is the associated stress marker. In some examples, the pronunciation system 106 may use a cross-entropy loss for the second recurrent neural network 200*b* where each input is a one-hot encoding of a phoneme and a one-hot encoding of a spelling label and a target is the associated stress maker, e.g., stress value.

The pronunciation system 106 may use a connectionist temporal classification (CTC) objective function for the third recurrent neural network 200*c*. For instance, the pronunciation system 106 may use a CTC objective function since an alignment between the input spelling and the output phoneme sequence and stress values is unknown.

In some implementations, the pronunciation system 106 may train the recurrent neural network 120 using examples taken from a pronunciation dictionary. For instance, each example in a training set may represent a different word and include labels for input, e.g., spelling labels, pronunciation labels, or both, and target outputs determined from a dictionary entry.

The target output may correspond to the input type. For instance, when the input type is only a spelling of a word, the target output may be both a pronunciation of the word and a stress pattern for the word. When the input is a pronunciation of a word or a pronunciation and a spelling of the word, the target output may be a stress pattern for the word.

In some implementations, the pronunciation system 106 may train the recurrent neural network 120 using a dropout technique, e.g., to improve robustness. For instance, the pronunciation system 106 may train the recurrent neural network 120 using a dropout technique to reduce overfitting in the neural network. With this technique, sections of the network may be randomly selected to "drop out" or fail to propagate signals for one or more training operations.

The user device 102 may include personal computers, mobile communication devices, smart phones, tablets, and other devices that can send and receive data over a network 104. The network 104, such as a local area network (LAN), wide area network (WAN), the Internet, or a combination thereof, connects the user device 102 and the pronunciation system 106. The pronunciation system 106 is an example of a system implemented as computer programs on one or more computers in one or more locations, in which the systems, components, and techniques described below are implemented.

In some implementations, one or more of the modules of the pronunciation system 106 may perform actions described with reference to another of the modules. For instance, the formatting module 130 may receive the spelling data 126 and generate the formatted spelling data 132, e.g., without receiving the spelling data 126 from the input module 124.

The models described herein can be used in a number of ways. In some implementations, text-to-speech processing is done on a server. A client send text for a synthesized utterance to a server over a network, and the server uses one of the models discussed above to determine pronunciation information. Depending on the model, the pronunciation information generated may indicate stress for a word, phones in a word, and/or syllable boundaries of a word. The server then uses the pronunciation information to generate audio data of a synthesized utterance and provides the audio data to the client over the network.

In some implementations, the output of models discussed herein can be used to generate a pronunciation dictionary, e.g., data that maps words to pronunciations. The pronunciation dictionary can be provided to a client device and stored for later use in generating synthesized TTS utterances. A TTS engine running on the client device can look up a word in the locally-stored pronunciation dictionary, and use the corresponding pronunciation information retrieved to generate a synthesized utterance for the word.

In some implementations, the models discussed herein can be used to determine pronunciation information for a TTS engine when a pronunciation dictionary does not include pronunciation for a word. For example, the pronunciation dictionary stored at a client device, whether generated manually or using the output of a neural network, may be limited and generally does not include pronunciation information for all possible words due to space constraints. When a client device determines that a word does not have a corresponding pronunciation in a local pronunciation dictionary, the client device may generate a pronunciation for the missing word using a locally stored and executed neural network model. Thus, a client device may use a locally-stored pronunciation dictionary to look up pronunciations of common words, while using a locally-stored pronunciation model to generate pronunciations of less-common words as needed. The client device may periodically receive and store updated pronunciation models and updated pronunciation dictionaries from a server over a network. As another example, when a client device determines that a word does not have a pronunciation listed in a pronunciation dictionary, the client device may send a request to a server system that may use a pronunciation dictionary or a pronunciation model as described above to determine appropriate pronunciation information, then send the pronunciation information to the client device in response to the request.

Figure 3:
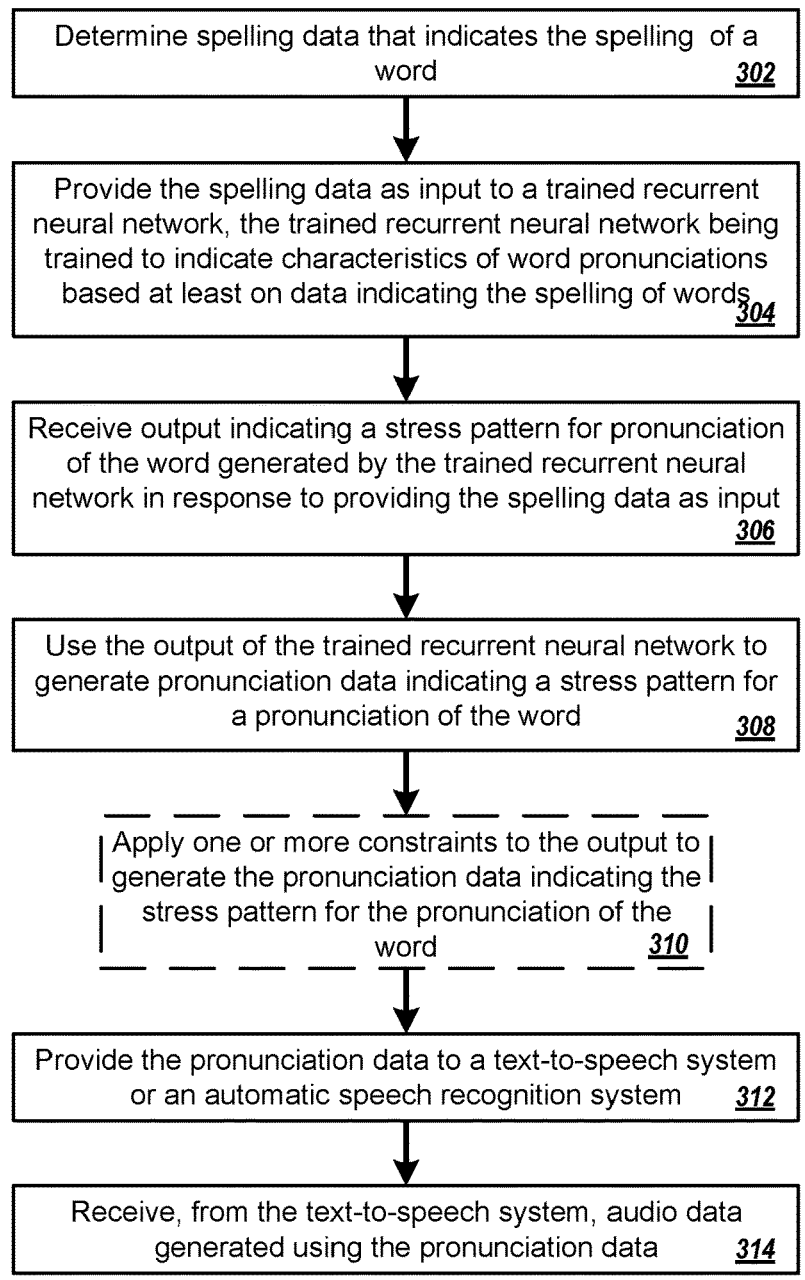
FIG. 3 is a flow diagram of a process for generating pronunciation data that indicates a stress pattern for a pronunciation of a word.

FIG. 3 is a flow diagram of a process 300 for generating pronunciation data that indicates a stress pattern for a pronunciation of a word. For example, the process 300 can be used by the pronunciation system 106, e.g., a server that includes one or more computers, from the environment 100.

A server determines spelling data that indicates the spelling of a word (302). For instance, the server may receive the spelling data from a user device or from a dictionary generation module, e.g., as part of a process to generate stress patterns for each word in the dictionary.

The server provides the spelling data as input to a trained recurrent neural network, the trained recurrent neural network being trained to indicate characteristics of word pronunciations based at least on data indicating the spelling of words (304). For instance, the server generates one-hot vectors that represent the spelling of the word and provide the one-hot vectors as the spelling data for input to the trained recurrent neural network.

In some examples, the trained recurrent neural network may be a long short-term memory recurrent neural network. For instance, the long-short term memory recurrent neural network may be any appropriate network, such as those described above with reference to FIGS. 2A-C.

The server provides data to the recurrent neural network based on the type of data for which the recurrent neural network is trained as input. In some implementations, the server may provide pronunciation data to the trained recurrent neural network with the spelling data. In some examples, the server may receive pronunciation data instead of spelling data and provide only the pronunciation data to the trained recurrent neural network.

The server receives output indicating a stress pattern for pronunciation of the word generated by the trained recurrent neural network in response to providing the spelling data as input (306). The server may receive output that indicates a pronunciation with the stress pattern.

The server uses the output of the trained recurrent neural network to generate pronunciation data indicating a stress pattern for a pronunciation of the word (308). For instance, when the output is only a stress pattern, the server may combine the stress pattern with pronunciation data. In some examples, the server receives, as output, vectors from the trained recurrent neural network that represent both the stress pattern and the pronunciation. The server uses the vectors to generate the pronunciation data that indicates the stress pattern for the word.

The server optionally applies one or more constraints to the output to generate the pronunciation data indicating the stress pattern for the pronunciation of the word (310). For instance, as part of the process of generating the pronunciation data, the server may apply the constraints to the output of the trained recurrent neural network. In some examples, the server may use a finite state transducer to apply the constraints to the output.

The server provides the pronunciation data to a text-to-speech system or an automatic speech recognition system (312). For example, the server provides the pronunciation data that indicates the stress pattern for the word to a text-to-speech system that generates an audio signal for a synthesized utterance of the word. In some examples, the server provides the pronunciation data that indicates the stress pattern for the word to an automatic speech recognition system for use during speech recognition.

The server receives audio data generated using the pronunciation data (314). For instance, the server may receive the audio data from the text-to-speech system in response to providing the pronunciation data to the text-to-speech system. The server may provide the audio data to a user device for a synthesized speech generation processes, e.g., which presents the audio data using a speaker.

In some implementations, the process 300 can include additional steps, fewer steps, or some of the steps can be divided into multiple steps. For example, the process 300 may include steps 302 through 308 without one or more of the steps 310 through 314.

In some implementations, a user device may perform part or all of the process 300. For instance, the user device may determine the spelling data, provide the spelling data to the server, and receive the pronunciation data. The user device may provide the pronunciation data to the text-to-speech system or the automatic speech recognition system. The user device may receive the audio data from the text-to-speech system, e.g., in examples when the user device provided the pronunciation data to the text-to-speech system.

In some implementations, a system, e.g., a user device, a pronunciation system, or both, may use a pronunciation generation system, e.g., and at least some of the steps in the process 300, to generate pronunciations for "loan" or "foreign" words that appear in a lexicon of a language or for new words added to a lexicon of a language. For example, a system may use the process 300 to generate pronunciations for a name of a new musician, a name of a new product, words that people make up in conversations, or two or more of these. For instance, a user device may include a pronunciation dictionary with stress patterns for words from the language. When the user device, as part of a text-to-speech process, detects a word that is not included in the dictionary, e.g., is a word from a different language, the user device may send data for the word to the pronunciation generation system. In response, the user device receives a stress pattern and a pronunciation for the word, e.g., which the user device may use in the text-to-speech process.

In some implementations, a system may use the methods described above as part of a pronunciation dictionary creation program to reduce the amount of work required to create a new entry in a pronunciation dictionary. When the system receives input representing a new word, e.g., from a user or from a document, the system can use the methods described above to generate a suggested pronunciation or part of a suggested pronunciation and provide the suggested pronunciation for presentation, e.g., to a user.

In some implementations, a system may receive pronunciation data from a user and generate a stress pattern using the received pronunciation data. For instance, the system may receive an audio signal encoding an utterance of the user, e.g., of the word "hire." The system may use any appropriate method to generate a pronunciation, e.g., "h ai<stress>. er<stress>", using the audio signal encoding the utterance. The system provides the pronunciation "h ai<stress>. er<stress>" to a pronunciation system to cause the pronunciation system to generate a stress pattern for the word, e.g., the stress pattern "E E 1 E E 0". The system may use the pronunciation of the word to later generate a synthesized utterance of the word and provide the synthesized utterance for presentation, e.g., to the user or another user.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
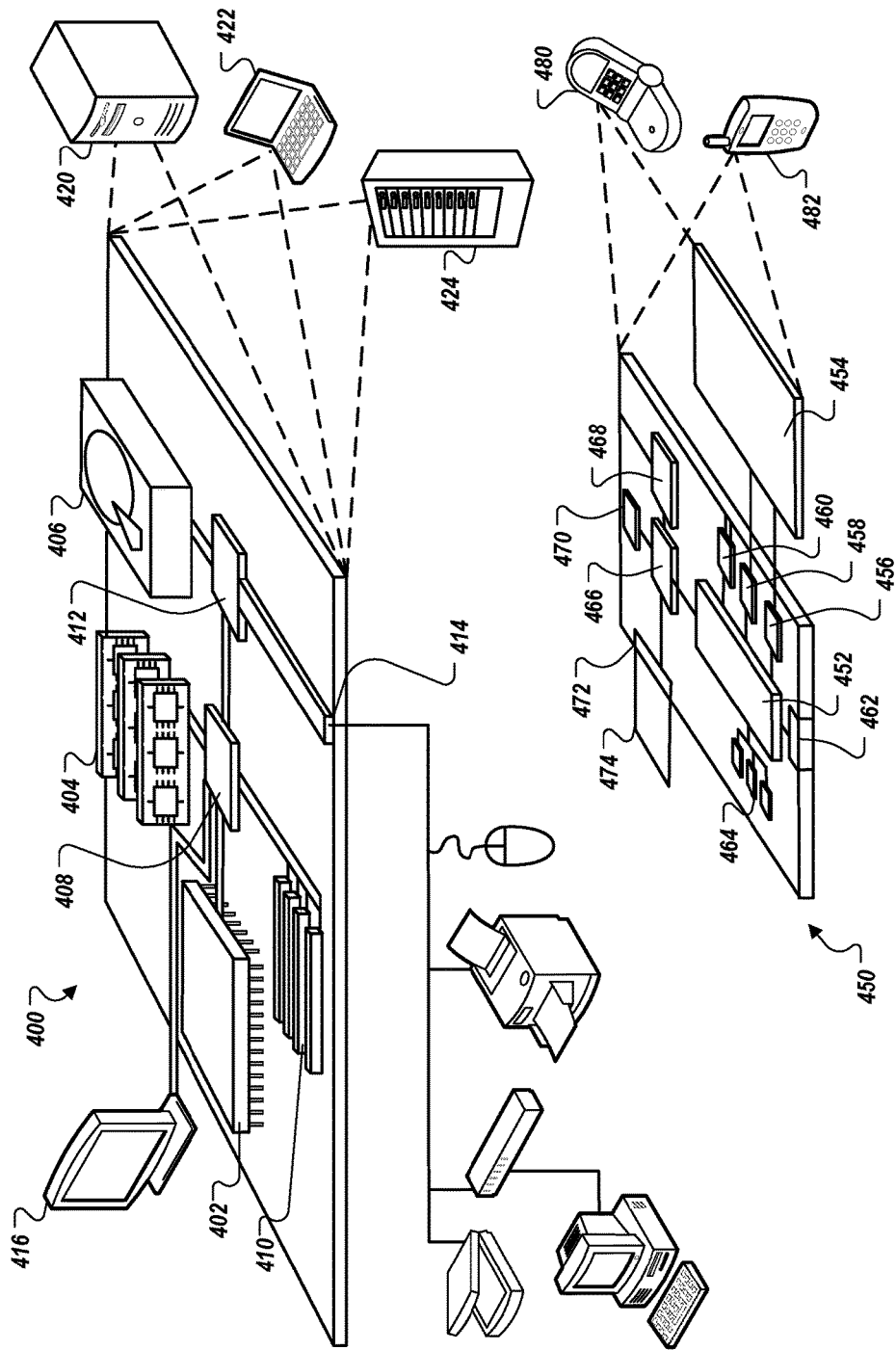
FIG. 4 is a block diagram of a computing system that can be used in connection with computer-implemented methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers of a text-to-speech synthesis system, the method comprising:
   determining, by the one or more computers of the text-to-speech synthesis system, spelling data that indicates the spelling of a word;
   determining, by the one or more computers of the text-to-speech synthesis system, first pronunciation data that indicates at least one stress location for the word;
   providing, by the one or more computers of the text-to-speech synthesis system, the spelling data and the first pronunciation data as input to a trained recurrent neural network, the trained recurrent neural network being trained to indicate characteristics of word pronunciations based at least on data indicating the spelling of words;
   receiving, by the one or more computers of the text-to-speech synthesis system, output representing a stress pattern for pronunciation of the word, the output being generated by the trained recurrent neural network in response to providing the spelling data and the first pronunciation data as input;
   using, by the one or more computers of the text-to-speech synthesis system, the output of the trained recurrent neural network to generate second pronunciation data indicating a stress pattern for a pronunciation of the word, wherein the second pronunciation data is different from the first pronunciation data that indicates at least one stress location for the word;
   generating, using the second pronunciation data, audio data that includes a synthesized utterance of the word and applies stress to the word based on the stress pattern indicated by the second pronunciation data; and
   providing, by the one or more computers of the text-to-speech synthesis system, the audio data to a system that includes at least one speaker for audible presentation of the synthesized utterance of the word using the audio data.

2. The method of claim 1, wherein:
   providing the spelling data and the first pronunciation data as input to the trained recurrent neural network comprises providing the spelling data and the first pronunciation data as input to a trained long short-term memory recurrent neural network; and
   receiving the output representing the stress pattern for pronunciation of the word generated by the trained recurrent neural network comprises receiving the output representing the stress pattern for pronunciation of the word generated by the trained long short-term memory recurrent neural network in response to providing the spelling data and the first pronunciation data as input.

3. The method of claim 1, wherein using, by the one or more computers, the output of the trained recurrent neural network to generate the second pronunciation data indicating the stress pattern for the pronunciation of the word comprises using the output to generate the second pronunciation data that indicates at least one primary stress location.

4. The method of claim 1, wherein using, by the one or more computers, the output of the trained recurrent neural network to generate the second pronunciation data indicating the stress pattern for the pronunciation of the word comprises using the output to generate the second pronunciation data that indicates a sequence of phones for the word with stress and syllable divisions and stress values.

5. The method of claim 1, wherein:
   providing, by the one or more computers, the spelling data and the first pronunciation data as input to the trained recurrent neural network comprises providing a plurality of input vectors for the spelling data as input to the trained recurrent neural network, each of the plurality of input vectors indicating a particular character from the spelling data or filler; and
   receiving the output representing the stress pattern for pronunciation of the word generated by the trained recurrent neural network comprises receiving a plurality of output vectors that each indicate a probability distribution over a set of symbols, a combination of the plurality of output vectors indicating the stress pattern for pronunciation of the word generated by the trained recurrent neural network.

6. The method of claim 5, wherein:
   providing the plurality of input vectors comprises providing a predetermined number of input vectors to the trained recurrent neural network as the input; and receiving the plurality of output vectors comprises receiving the predetermined number of output vectors from the trained recurrent neural network as the output.

7. The method of claim 1, wherein using, by the one or more computers, the output of the trained recurrent neural network to generate the second pronunciation data indicating the stress pattern for the pronunciation of the word comprises applying one or more constraints to the output to generate the second pronunciation data indicating the stress pattern for the pronunciation of the word.

8. The method of claim 7, wherein applying the one or more constraints to the output to generate the second pronunciation data indicating the stress pattern for the pronunciation of the word comprises:
using beam search on the output of the trained recurrent neural network to determine a path in the output with a highest likelihood of satisfying the one or more constraints; and
using the path with the highest likelihood of satisfying the one or more constraints to generate the second pronunciation data indicating the stress pattern for the pronunciation of the word.

9. The method of claim 7, wherein applying the one or more constraints to the output to generate the second pronunciation data indicating the stress pattern for the pronunciation of the word comprises applying, by a network of finite state transducers, the one or more constraints to the output to generate the second pronunciation data indicating the stress pattern for the pronunciation of the word.

10. A text-to-speech synthesis system comprising:
one or more data processing apparatus; and
one or more non-transitory computer readable storage media in data communication with the one or more data processing apparatus and storing instructions executable by the one or more data processing apparatus and upon such execution cause the one or more data processing apparatus to perform operations comprising:
determining spelling data that indicates the spelling of a word;
determining first pronunciation data that indicates at least one stress location for the word;
providing the spelling data and the first pronunciation data as input to a trained recurrent neural network, the trained recurrent neural network being trained to indicate characteristics of word pronunciations based at least on data indicating the spelling of words;
receiving output representing a stress pattern for pronunciation of the word, the output being generated by the trained recurrent neural network in response to providing the spelling data and the first pronunciation data as input;
using the output of the trained recurrent neural network to generate second pronunciation data indicating a stress pattern for a pronunciation of the word, wherein the second pronunciation data is different from the first pronunciation data that indicates at least one stress location for the word;
generating, using the second pronunciation data, audio data that includes a synthesized utterance of the word and applies stress to the word based on the stress pattern indicated by the second pronunciation data; and
providing, as output of the text-to-speech synthesis system, the audio data to a system that includes at least one speaker for audible presentation of the synthesized utterance of the word using the audio data.

11. The system of claim 10, wherein:
providing the spelling data and the first pronunciation data as input to the trained recurrent neural network comprises providing the spelling data and the first pronunciation data as input to a trained long short-term memory recurrent neural network; and
receiving the output representing the stress pattern for pronunciation of the word generated by the trained recurrent neural network comprises receiving the output representing the stress pattern for pronunciation of the word generated by the trained long short-term memory recurrent neural network in response to providing the spelling data and the first pronunciation data as input.

12. The system of claim 10, wherein using the output of the trained recurrent neural network to generate the second pronunciation data indicating the stress pattern for the pronunciation of the word comprises using the output to generate the second pronunciation data that indicates at least one primary stress location.

13. The system of claim 10, wherein using the output of the trained recurrent neural network to generate the second pronunciation data indicating the stress pattern for the pronunciation of the word comprises using the output to generate the second pronunciation data that indicates a sequence of phones for the word with stress and syllable divisions and stress values.

14. The system of claim 10, wherein:
providing the spelling data and the first pronunciation data as input to the trained recurrent neural network comprises providing a plurality of input vectors for the spelling data as input to the trained recurrent neural network, each of the plurality of input vectors indicating a particular character from the spelling data or filler; and
receiving the output representing the stress pattern for pronunciation of the word generated by the trained recurrent neural network comprises receiving a plurality of output vectors that each indicate a probability distribution over a set of symbols, a combination of the plurality of output vectors indicating the stress pattern for pronunciation of the word generated by the trained recurrent neural network.

15. The system of claim 14, wherein:
providing the plurality of input vectors comprises providing a predetermined number of input vectors to the trained recurrent neural network as the input; and
receiving the plurality of output vectors comprises receiving the predetermined number of output vectors from the trained recurrent neural network as the output.

16. The system of claim 10, wherein using the output of the trained recurrent neural network to generate the second pronunciation data indicating the stress pattern for the pronunciation of the word comprises applying one or more constraints to the output to generate the second pronunciation data indicating the stress pattern for the pronunciation of the word.

17. One or more non-transitory computer readable storage media storing instructions executable by one or more data processing apparatus of a text-to-speech synthesis system and upon such execution cause the one or more data processing apparatus to perform operations comprising:
determining spelling data that indicates the spelling of a word;
determining first pronunciation data that indicates at least one stress location for the word;

providing the spelling data and the first pronunciation data as input to a trained recurrent neural network, the trained recurrent neural network being trained to indicate characteristics of word pronunciations based at least on data indicating the spelling of words;

receiving output representing a stress pattern for pronunciation of the word, the output being generated by the trained recurrent neural network in response to providing the spelling data and the first pronunciation data as input;

using the output of the trained recurrent neural network to generate second pronunciation data indicating a stress pattern for a pronunciation of the word, wherein the second pronunciation data is different from the first pronunciation data that indicates at least one stress location for the word;

generating, using the second pronunciation data, audio data that includes a synthesized utterance of the word and applies stress to the word based on the stress pattern indicated by the second pronunciation data; and providing, as output of the text-to-speech synthesis system, the audio data to a system that includes at least one speaker for audible presentation of the synthesized utterance of the word using the audio data.

18. The computer readable storage medium of claim 17, wherein:

providing the spelling data and the first pronunciation data as input to the trained recurrent neural network comprises providing the spelling data and the first pronunciation data as input to a trained long short-term memory recurrent neural network; and receiving the output representing the stress pattern for pronunciation of the word generated by the trained recurrent neural network comprises receiving the output representing the stress pattern for pronunciation of the word generated by the trained long short-term memory recurrent neural network in response to providing the spelling data and the first pronunciation data as input.

19. The computer readable storage medium of claim 17, wherein using the output of the trained recurrent neural network to generate the second pronunciation data indicating the stress pattern for the pronunciation of the word comprises applying one or more constraints to the output to generate the second pronunciation data indicating the stress pattern for the pronunciation of the word.

* * * * *

UNITED STATES PATENT AND TRADEMARK OFFICE
CERTIFICATE OF CORRECTION

PATENT NO.         : 10,255,905 B2
APPLICATION NO.    : 15/178719
DATED              : April 9, 2019
INVENTOR(S)        : Chua et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 105 days.

Signed and Sealed this
Tenth Day of December, 2019

Andrei Iancu
*Director of the United States Patent and Trademark Office*